(12) United States Patent
Nicks

(10) Patent No.: US 11,505,320 B2
(45) Date of Patent: Nov. 22, 2022

(54) DEPLOYABLE HANDLE SYSTEM FOR A VEHICLE

(71) Applicant: The Boeing Company, Chicago, IL (US)

(72) Inventor: Eric Nicks, Defiance, MO (US)

(73) Assignee: THE BOEING COMPANY, Chicago, IL (US)

( * ) Notice: Subject to any disclaimer, the term of this patent is extended or adjusted under 35 U.S.C. 154(b) by 725 days.

(21) Appl. No.: 16/458,867

(22) Filed: Jul. 1, 2019

(65) Prior Publication Data
US 2021/0001984 A1 Jan. 7, 2021

(51) Int. Cl.
*B64D 11/00* (2006.01)
*G01C 23/00* (2006.01)
*B60N 3/00* (2006.01)
*G01C 21/16* (2006.01)
*B60N 3/02* (2006.01)

(52) U.S. Cl.
CPC .............. *B64D 11/00* (2013.01); *B60N 3/002* (2013.01); *G01C 23/00* (2013.01); *B60N 3/02* (2013.01); *G01C 21/16* (2013.01)

(58) Field of Classification Search
CPC ....... B64D 11/00; B64D 11/0611; B60N 3/02; B60N 3/023
USPC .............................................. 244/118.5, 122
See application file for complete search history.

(56) References Cited

U.S. PATENT DOCUMENTS

| | | | | |
|---|---|---|---|---|
| 6,364,343 | B1* | 4/2002 | Slota ..................... | B60R 21/213 280/730.2 |
| 7,934,678 | B2* | 5/2011 | Wieding .............. | B64D 11/003 244/118.5 |
| 2001/0011836 | A1* | 8/2001 | Grey ..................... | B60N 3/023 296/214 |
| 2007/0204437 | A1* | 9/2007 | Hartmann, Jr. ........ | B60N 3/023 16/444 |
| 2007/0257499 | A1* | 11/2007 | Lipke ..................... | B60N 3/026 296/1.08 |
| 2008/0217941 | A1* | 9/2008 | Chernoff ................ | B60N 3/023 296/1.02 |
| 2009/0108607 | A1* | 4/2009 | Browne ................. | B60N 3/023 296/1.02 |
| 2009/0243319 | A1* | 10/2009 | Browne ................. | B60N 3/023 296/1.02 |
| 2017/0320420 | A1* | 11/2017 | Logan, Jr. .............. | B60J 5/0493 |
| 2018/0147965 | A1* | 5/2018 | Wang ..................... | E05B 85/12 |

(Continued)

*Primary Examiner* — Jose V Chen
(74) *Attorney, Agent, or Firm* — Vivacqua Crane, PLLC

(57) ABSTRACT

A handle system for a vehicle is disclosed and includes a support structure defining a handle. The support structure is movable between a stowed position where the handle is inaccessible by a passenger and a deployed position where the handle is accessible by the passenger. The handle system also includes an actuator operably coupled to the support structure and configured to move the support structure between the stowed position and the deployed position. The handle system further includes one or more sensors configured to obtain data indicative of vehicle motion and a controller. The controller is configured to determine the vehicle exceeds a threshold rate of movement based on the data obtained by the one or more sensors. In response to determining the vehicle exceeds the threshold rate of movement, the controller instructs the actuator to move the support structure from the stowed position into the deployed position.

20 Claims, 8 Drawing Sheets

(56) References Cited

U.S. PATENT DOCUMENTS

| | | | |
|---|---|---|---|
| 2019/0217776 A1* | 7/2019 | Sato | H05B 45/20 |
| 2020/0215951 A1* | 7/2020 | Xiao | E05B 1/0015 |
| 2020/0324678 A1* | 10/2020 | Kadam | B60R 21/02 |
| 2022/0072987 A1* | 3/2022 | Sakurai | B60N 3/023 |

* cited by examiner

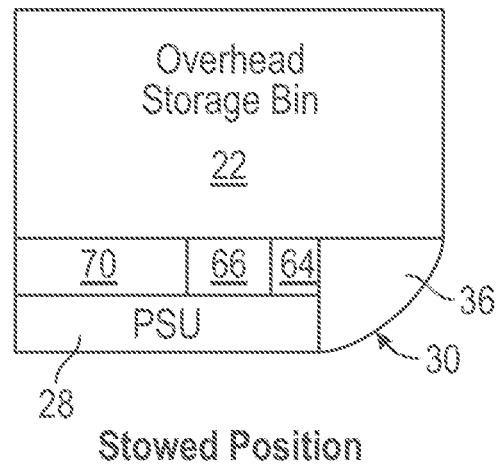
FIG. 4 Stowed Position
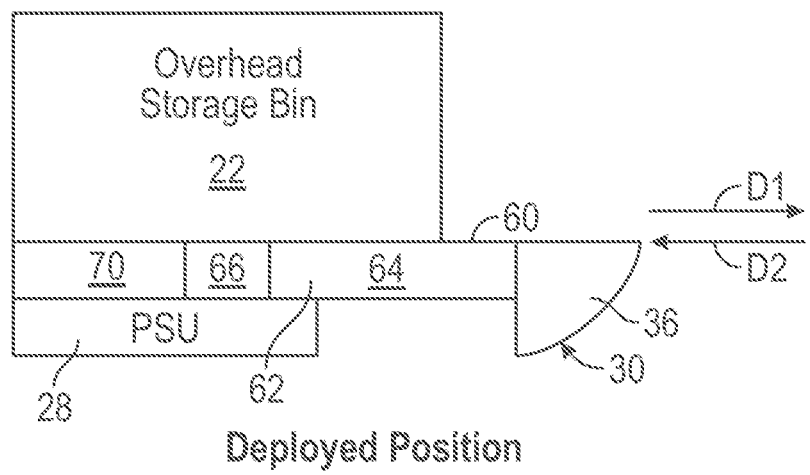
FIG. 5 Deployed Position

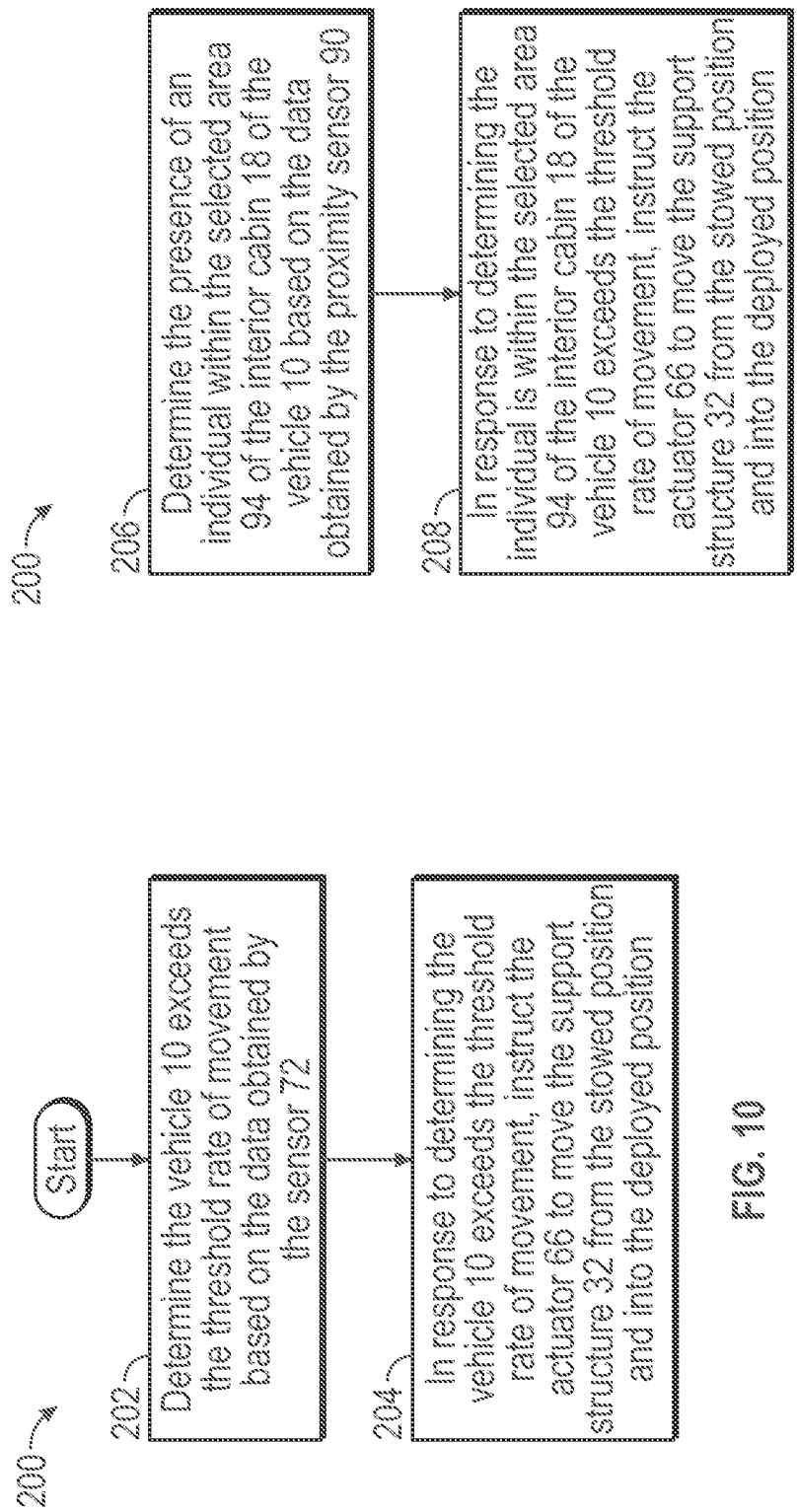

DEPLOYABLE HANDLE SYSTEM FOR A VEHICLE

INTRODUCTION

The present disclosure relates to a deployable handle system for a vehicle. More particularly, the present disclosure relates to a handle system having a support structure, where the support structure is movable from a stowed position and into a deployed position during an abrupt change in motion by the vehicle.

BACKGROUND

The interior cabin of an aircraft includes various features that many passengers find aesthetically pleasing. For example, the interior cabin of an aircraft may include sleek interior surfaces in an effort to create an environment that passengers find attractive. While sleek interior surfaces may be visually pleasing, these surfaces may not provide features for passengers and flight attendants to grab and hold onto during an abrupt change in motion of the aircraft. An aircraft may undergo an abrupt change in motion when encountering turbulence or while performing a severe maneuver. During an abrupt change in motion, individuals who are standing or walking along an aisle of the interior cabin of the aircraft may lose their balance and may require additional support. However, these individuals may not have access to features within the interior cabin of the aircraft to grab and hold for support.

In one approach, support structures such as rails, handles, or grab bars may be introduced within the aircraft's interior cabin to provide a surface for individuals to grab and hold onto for support. However, rails, handles, and grab bars tend to disrupt the overall harmony of the aircraft's sleek interior design. There is therefore a need for improved handle systems for a vehicle.

SUMMARY

According to several aspects, a handle system for a vehicle is disclosed. The handle system includes a support structure defining a handle. The support structure is movable between a stowed position where the handle is inaccessible by a passenger and a deployed position where the handle is accessible by the passenger. The handle system further includes an actuator operably coupled to the support structure and configured to move the support structure between the stowed position and the deployed position. The handle system further includes one or more sensors configured to obtain data indicative of vehicle motion and a controller in electronic communication with the actuator and the one or more sensors. The controller determines the vehicle exceeds a threshold rate of movement based on the data indicative of vehicle motion obtained by the one or more sensors, where the threshold rate of movement indicates an abrupt change in motion by the vehicle. In response to determining the vehicle exceeds the threshold rate of movement, the controller instructs the actuator to move the support structure from the stowed position and into the deployed position.

In another aspect, an aircraft having an interior cabin and a handle system located within the interior cabin of the aircraft is disclosed. The handle system includes a support structure defining a handle. The support structure is movable between a stowed position where the handle is inaccessible by a passenger and a deployed position where the handle is accessible by the passenger. The handle system also includes an actuator operably coupled to the support structure and configured to move the support structure between the stowed position and the deployed position. The handle system further includes one or more sensors configured to obtain data indicative of motion of the aircraft and a controller in electronic communication with the actuator and the one or more sensors. The controller determines the vehicle exceeds a threshold rate of movement based on the data indicative of motion of the aircraft obtained by the one or more sensors, where the threshold rate of movement indicates an abrupt change in motion by the aircraft. In response to determining the aircraft exceeds the threshold rate of movement, the controller instructs the actuator to move the support structure from the stowed position and into the deployed position.

In still another aspect, a method of extending a handle of a support structure from a stowed position and into a deployed position is disclosed. The handle is part of a handle system of a vehicle. The method includes determining, by a computer, the vehicle exceeds a threshold rate of movement based on data indicative of vehicle motion obtained by one or more sensors, where the threshold rate of movement indicates an abrupt change in motion by the vehicle. In response to determining the vehicle exceeds the threshold rate of movement, the method includes instructing an actuator to move the support structure from the stowed position and into the deployed position. The actuator is operably coupled to the support structure and configured to move the support structure between the stowed position and the deployed position.

The features, functions, and advantages that have been discussed may be achieved independently in various embodiments or may be combined in other embodiments further details of which can be seen with reference to the following description and drawings.

BRIEF DESCRIPTION OF THE DRAWINGS

The drawings described herein are for illustration purposes only and are not intended to limit the scope of the present disclosure in any way.

FIG. 4 is a schematic diagram of the handle system in the stowed position, according to an exemplary embodiment;

FIG. 5 is a schematic diagram of the handle system in the deployed position, according to an exemplary embodiment;

FIGS. 10-12 illustrate various process flow diagrams illustrating methods for deploying the handle system, according to an exemplary embodiment.

DETAILED DESCRIPTION

The present disclosure is directed towards a handle system for a vehicle. The handle system includes a support structure defining a handle. The support structure is normally located in a stowed position. When the support structure is in the stowed position, the handle is inaccessible by passengers. However, in response to determining the vehicle is undergoing an abrupt change in motion, a controller instructs an actuator to extend the support structure into a deployed position. The handle is accessible to passengers in the deployed position. Since the support structure is normally retracted and in the stowed position, the handle does not generally interfere with the interior cabin's sleek interior design. However, the support structure still extends into the deployed position to provide support to passengers during an abrupt change in motion. For example, if the vehicle is an aircraft, then the abrupt change in motion is experienced during turbulence, an abnormal gravity angle, a sudden stop, and/or landing.

The following description is merely exemplary in nature and is not intended to limit the present disclosure, application, or uses.

Figure 1:
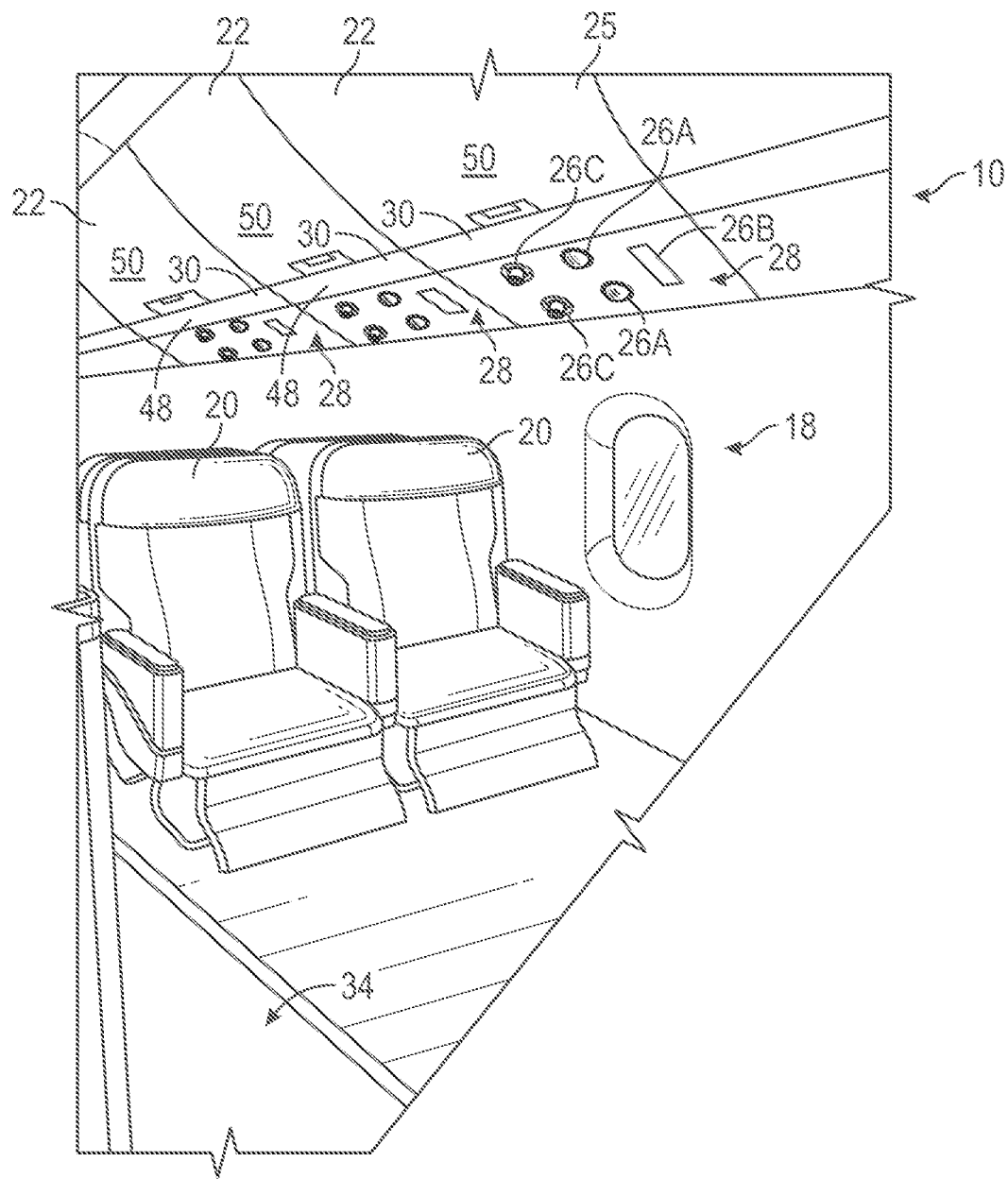
FIG. 1 illustrates an interior cabin of a vehicle including a deployable handle system, where the handle system has a support structure that is in a stowed position, according to an exemplary embodiment.

Referring to FIG. 1, an exemplary interior cabin 18 of a vehicle 10 is shown. The interior cabin 18 includes a plurality of seats 20 arranged in one or more columns C and one or more rows R (seen in FIG. 2). In the exemplary embodiment as shown, a plurality of overhead storage bins 22 are positioned above the seats 20. The overhead storage bins 22 each include a door 25 that provides access to an interior of the corresponding overhead storage bin 22. A passenger service unit (PSU) 28 is mounted below a corresponding overhead storage bin 22. Each PSU 28 includes various passenger amenities such as, for example, overhead lighting 26A, illuminated signs 26B, air vents 26C, and deployable oxygen masks (not visible in FIG. 1). The amenities are provided for the passengers positioned in the seats 20 located directly below a corresponding one of the PSUs 28. A handle system 30 is also located below a corresponding overhead storage bin 22. The handle system 30 includes a support structure 32 (seen in FIG. 3). The support structure 32 is movable between a stowed position seen in FIG. 1 and a deployed position in FIG. 3. As explained below, the support structure 32 includes a handle 36 (FIG. 3) that is accessible by a passenger when the support structure 32 is in the deployed position.

Figure 2:
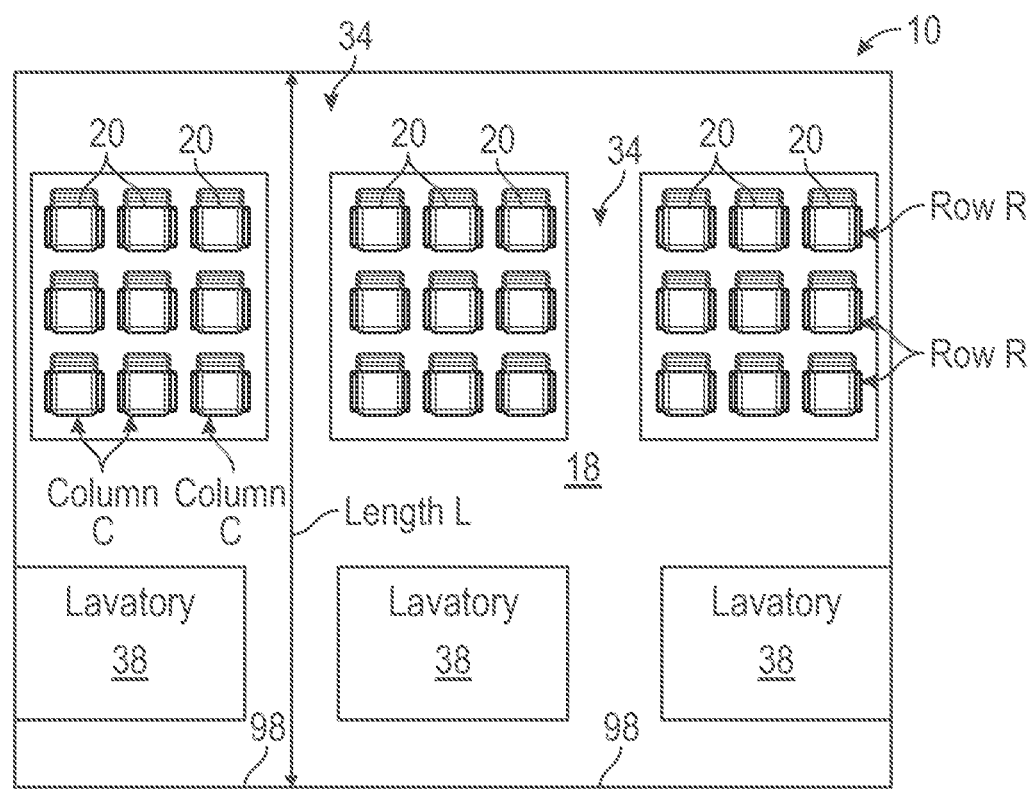
FIG. 2 is a schematic diagram of the interior cabin of the vehicle shown in FIG. 1, according to an exemplary embodiment.

FIG. 2 is a schematic diagram of the interior cabin 18 of the vehicle 10. The seats 20 are arranged vertically into one or more rows R and horizontally into one or more columns C. One or more aisles 34 are located between the rows R of seats R. The aisles 34 define a passage or walkway for passengers to move about within the interior cabin 18 of the vehicle 10. For example, a passenger may walk along the aisle 34 to exit the vehicle 10, to access a lavatory 38, or to move to another seat 20.

Referring to FIGS. 1 and 2, sometimes the vehicle 10 undergoes an abrupt change in motion. For example, if the vehicle 10 is an aircraft then the abrupt change in motion is created as the aircraft undergoes turbulence or experiences an abnormal gravity angle while in flight. An abnormal gravity angle refers to a sudden turn or maneuver made by the aircraft. It is to be appreciated that the abrupt change in motion is not limited to when the aircraft is in flight. For example, if the aircraft is taxiing along a runway then the abrupt change in motion is created as the aircraft comes to a sudden stop. Furthermore, the abrupt change in motion may also occur during landing. Although an aircraft is described, the vehicle 10 is not limited to an aircraft. In another embodiment the vehicle 10 is a bus, a train, a marine vessel, or any other type of vehicle that includes an aisle or other area where passengers stand on or walk.

As the vehicle 10 undergoes an abrupt change in motion, a passenger who is standing or walking in the interior cabin 18 may experience a loss in steadiness or balance. This is because the lower body of a passenger, which is in contact with the vehicle 10, comes to a rest while the upper body of the passenger tends to stay in motion due to inertia. Accordingly, when the vehicle 10 undergoes an abrupt change in motion, the support structure 32 of the handle system 30 is actuated from the stowed position (seen in FIG. 1) and into the deployed position (seen in FIG. 3) to provide support to one or more passengers located within the interior cabin 18 of the vehicle 10. In other words, the support structure 32 is normally in the stowed position but extends into the deployed position to provide support to one or more passengers.

Figure 3:
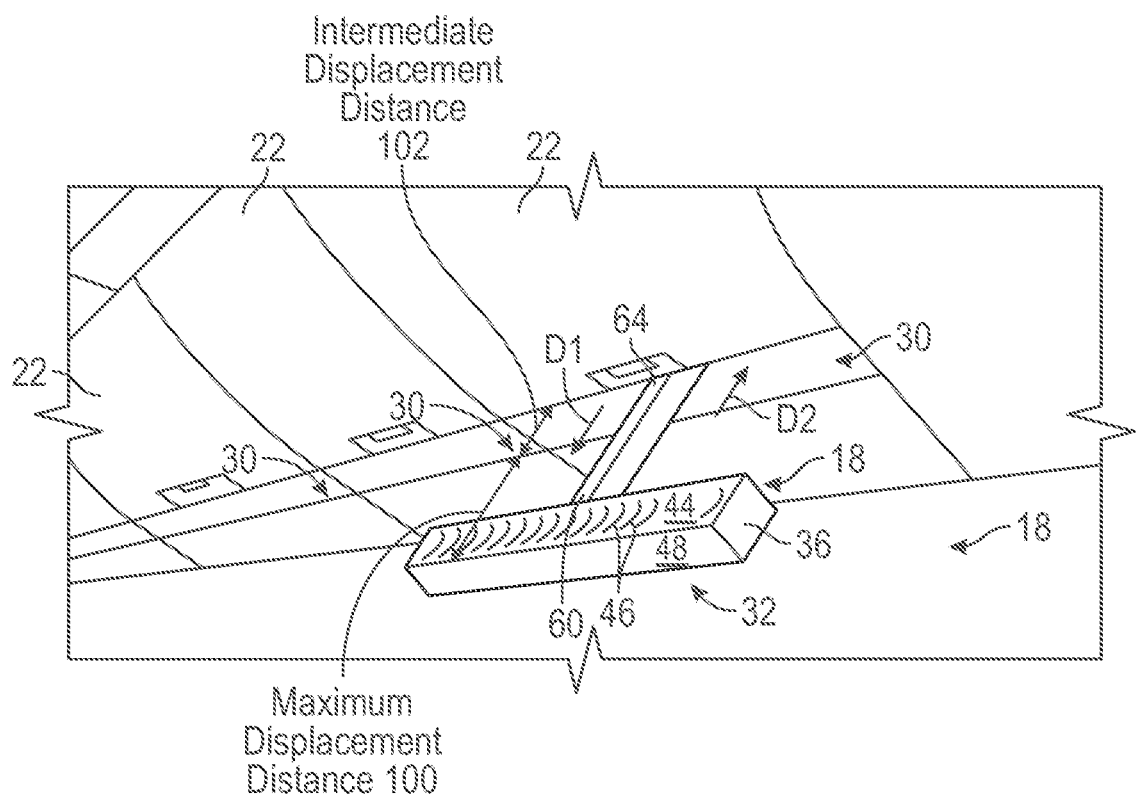
FIG. 3 illustrates the handle system shown in FIG. 1 in a deployed position, according to an exemplary embodiment.

Referring to FIG. 3, the handle 36 of the support structure 32 is sized and shaped for an individual to grasp and hold. In one exemplary embodiment, the handle 36 includes one or more textured surfaces 44. The textured surface 44 creates friction between the handle 36 and an individual's hand. For example, in the embodiment as shown in FIG. 3, the textured surface 44 includes ridges 46 that create friction between the handle 36 and an individual's hand. Although ridges 46 are shown, other features that create friction may be used instead for the textured surface 44. Alternatively, in another embodiment, instead of a textured surface 44, an outermost surface 48 of the handle 36 is covered with a friction coating instead. Some examples of friction coatings include, but are not limited to, rubber coatings and some paints.

Referring to both FIGS. 1 and 3, the handle 36 of the support structure is inaccessible to a passenger when in the stowed position. That is, a passenger is unable to grab and hold onto the handle 36 in the stowed position. In the embodiment as shown in FIG. 1, a portion of the outermost surface 48 of the handle 36 is flush with an outermost surface 50 of the interior cabin 18 of the vehicle 10. Specifically, FIG. 1 illustrates the outermost surface 50 of the interior cabin 18 is defined by the overhead storage bin 22. However, it is to be appreciated the handle 36 may be flush with other interior components as well such as, for example, seats, galley shells, and various interior panels. In one embodiment, the outermost surface 48 of the handle 36 and the outermost surface 50 of the corresponding overhead storage bin 22 include the same finish, color, and appearance to create a smooth, harmonious appearance.

The handle 36 of the support structure 32 is accessible to a passenger when in the deployed position. As seen in FIG. 3, the handle 36 is extended in a first direction D1 towards the aisle 34 of the interior cabin 18. Therefore, the handle 36 is no longer flush with the outermost surface 50 of the interior cabin 18 and provides a support feature for an individual to grab and hold. Referring to FIGS. 3 and 5, the support structure 32 is connected to a first end portion 60 of an arm 64. An actuator 66 is operably coupled to the support structure 32 by a second end portion 62 of the arm 64. As explained below, the actuator 66 is configured to move the support structure 32 between the stowed position and the deployed position.

FIGS. 4 and 5 are schematic diagrams of the overhead storage bin 22, the PSU 28, and the support structure 32.

FIG. 4 illustrates the handle 36 in the stowed position, and FIG. 5 illustrates the support structure 32 in the deployed position. It is to be appreciated that while the figures illustrate the handle system 30 mounted below the overhead storage bin 22 and above the PSU 28, the handle system 30 is not limited to the position as shown. Instead, the handle system 30 may be mounted upon or located in any area of the interior cabin 18 of the vehicle 10 (FIG. 1) where passengers may stand or walk and require support during an abrupt or sudden change in movement of the vehicle 10. For example, in another embodiment, the handle system 30 is mounted underneath the seats 20 that are directly adjacently to the aisle 24 (i.e., the aisle seats).

Figure 6:
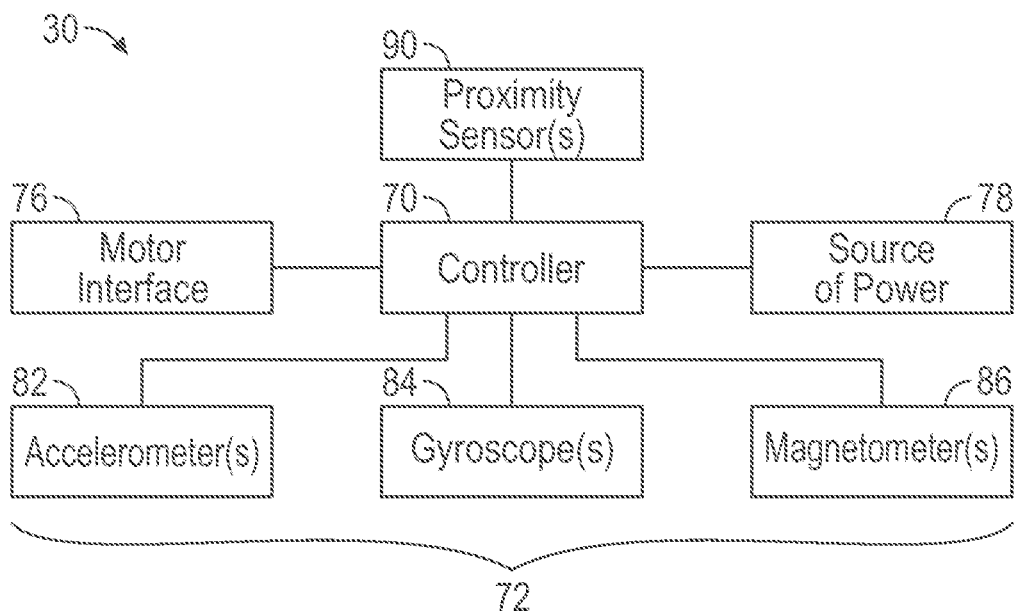
FIG. 6 is a schematic diagram of a controller in electronic communication with an actuator, one or more proximity sensors, and one or more sensors that indicate motion, according to an exemplary embodiment.

The handle system 30 includes the arm 64, the actuator 66, and a controller 70. The controller 70 is in electronic communication with the actuator 66 and one or more sensors 72 that indicate motion of the vehicle 10 (the sensors 72 are shown in FIG. 6). The actuator 66 is any type of actuation device configured to generate motion in the first direction D1 and a second direction D2. As mentioned above, the handle 36 is extended in the first direction D1 towards the aisle 34 of the interior cabin 18 (FIG. 1) and into the deployed position. When the handle 36 is no longer required for support by a passenger, the actuator 66 retracts the handle 36 in the second direction D2 away from the aisle 34 and back into the stowed position. Some examples of the actuator 66 include, but are not limited to, linear actuators such as pneumatic linear actuators, screw jack linear actuators, and electric motor driven linear actuators.

Figure 7:
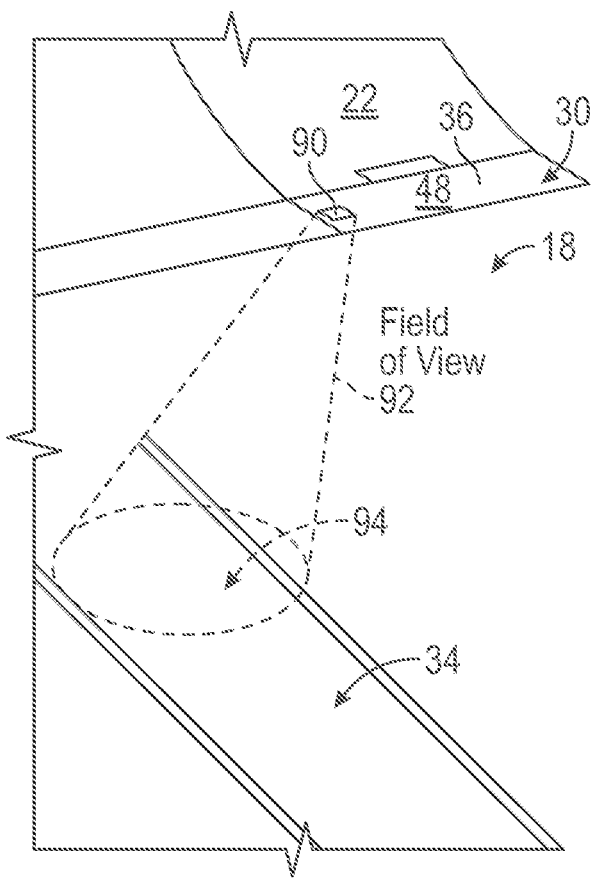
FIG. 7 illustrates the proximity sensor disposed along an outermost surface of the handle, according to an exemplary embodiment.

FIG. 6 is a schematic diagram of the controller 70 in electronic communication with a motor interface 76, the sensors 72 that indicate motion of the vehicle 10, and a source of power 78. The motor interface 76 is operably coupled to a motor driver 80 of the actuator 66. The sensors 72 are configured to obtain data indicating motion of the vehicle 10 and are not limited to only movement sensors. In an example, the sensors 72 may also include inertial sensors, force sensors, and/or magnetic field sensors. For instance, in the embodiment as shown in FIG. 7, the sensors 72 include one or more accelerometers 82, one or more gyroscopes 84, and one or more magnetometers 86 in electronic communication with the controller 70.

The accelerometers 82 obtain data indicating movement of the vehicle 10 based on an inertial force acting upon the vehicle 10. In an example, the units of measurement for the accelerometer 82 is measured in meters per second squared (m/s$^2$) or G-forces per second (Gs). In one embodiment, three accelerometers 82 are included to obtain measurements in the x, y, and z-axis orientations. The gyroscope 84 obtains data indicating an angular velocity of the vehicle 10. The magnetometer 86 obtains data indicating a direction, strength, and change in the Earth's magnetic field.

The controller 70 monitors the data obtained by the sensors 72 during operation of the vehicle 10. In the event the vehicle 10 undergoes an abrupt change in movement such as turbulence or an abnormal gravity angle when in flight, then the controller 70 determines the vehicle 10 exceeds a threshold rate of movement based on the data obtained from the sensors 72. The threshold rate of movement indicates the abrupt change in motion by the vehicle 10. In an example, in response to the vehicle 10 exceeding the threshold rate of movement, the accelerometers 82 indicate one or more of the following: (i) an inertial force acting upon the vehicle 10 that is either less than about 0.7 Gs or more than about 1.3 Gs with respect to either the x-axis or the y-axis, and/or (ii) an inertial force acting upon the vehicle 10 that is either less than about 0.6 Gs or more than about 1.4 Gs with respect to the z-axis. Movement in the x-axis and y-axis represent sideways motion of the vehicle 10, and movement in the z-axis represent up and down motion of the vehicle 10. Within examples, the threshold rate of movement for the vehicle 10 in the z-axis is higher than the threshold rate of movement in either the x-axis or the y-axis, since motion in an up and down motion in an aircraft does not generally affect a passenger's balance.

Within examples, the data from the gyroscope 84 and the magnetometer 86 are combined together to improve bank angle accuracy. In an embodiment, the vehicle 10 exceeding the threshold rate of movement corresponds to combined readings of the gyroscope 84 and the magnetometer 86 that indicate an orientation of more than about 20 degrees from parallel (i.e., the floor of the vehicle 10) to ground and a rate of movement that is more than about five degrees per second.

The one or more accelerometers 82 are configured to obtain inertial force data, the one or more gyroscopes 84 are configured to obtain angular velocity data, and the one or more magnetometers 86 are configured to obtain magnetic field data. In an embodiment, the controller 70 is configured to fuse the inertial force data, the angular velocity data, and magnetic field data together and produce a three-dimensional location value, a three-dimensional movement value, and a three dimensional acceleration value. The data obtained from the accelerometers 82, the gyroscope 84, and the magnetometer 86 are fused using any suitable technique. For example, in one embodiment a Kalman filter determines the three-dimensional location value. The controller 70 then determines the three-dimensional movement and the three-dimensional acceleration values based on multiple three-dimensional location values (as calculated by the Kalman filter) that are collected over a period of time. In an example, the threshold rate of movement (in units of acceleration) is about 15 ft/s$^2$ in the x-axis and the y-axis, and about 25 ft/s$^2$ in the z-axis. However, in other examples, higher or lower threshold rates of movement are possible as well.

In addition to the sensors 72, the handle system 30 further includes one or more proximity sensors 90 in electronic communication with the controller 70. Referring to FIG. 7, in one non-limiting embodiment the proximity sensors 90 are mounted along the outermost surface 48 of the handle 36. The proximity sensors 90 have a field of view 92 directed towards a selected area 94 of the interior cabin 18 of the vehicle 10. The selected area 94 of the interior cabin 18 of the vehicle 10 represents a portion of the vehicle 10 where passengers stand, walk, and move objects about the interior cabin 18. Some examples of objects that are commonly found within the interior cabin of the vehicle 10 include luggage and service trolleys. In the embodiment as shown in FIG. 7, the selected area 94 is the aisle 34 of the interior cabin 18. Accordingly, the field of view 92 of the proximity sensors 90 captures passengers who are located within the aisle 34 of the interior cabin 18 of the vehicle 10.

The proximity sensors 90 are configured to obtain data indicating a presence of an individual within the selected area 94 of the interior cabin 18 of the vehicle 10. In one non-limiting embodiment, the one or more proximity sensors 90 include, but are not limited to, a millimeter wave sensor, an infrared sensor, a light proximity sensor, a camera, a radar, and/or a light detection and ranging (LIDAR) sensor.

Figure 8:
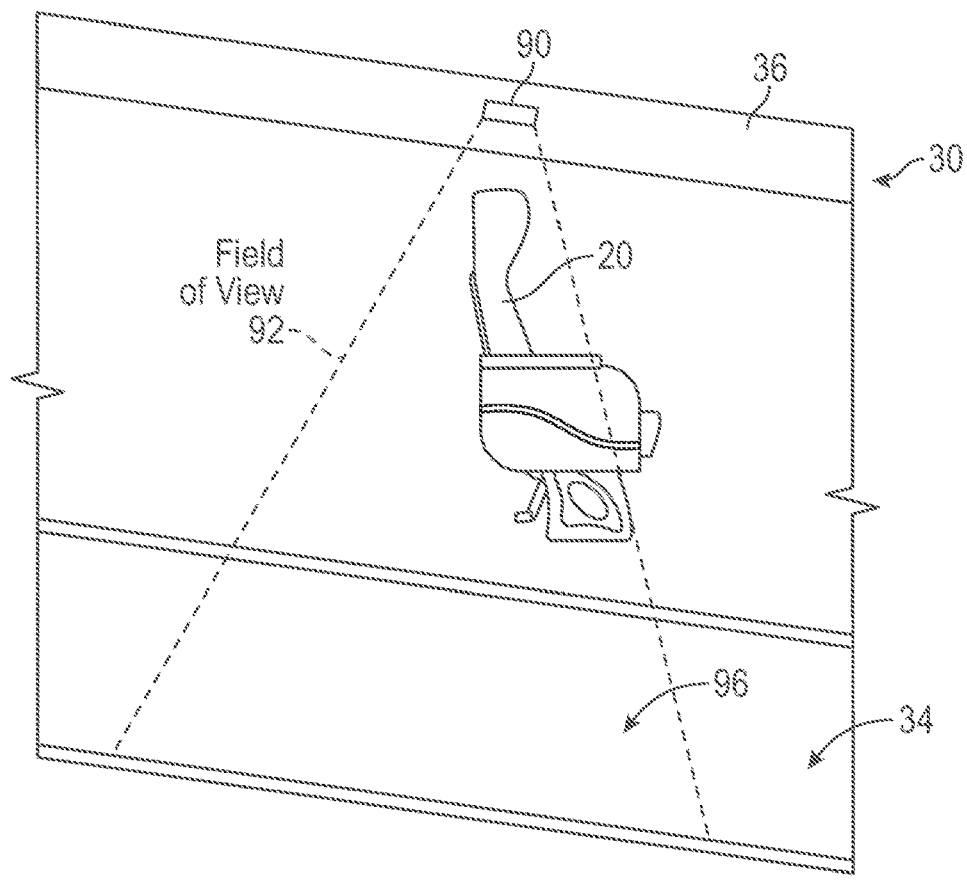
FIG. 8 is another illustration of the proximity sensor shown in FIG. 7, according to an exemplary embodiment.

Although FIG. 8 illustrates the proximity sensors 90 located along the outermost surface 48 of the handle 36, it is to be appreciated that this illustration is merely exemplary in nature. Instead, the proximity sensors 90 may be mounted in other areas of the interior cabin 18 of the vehicle 10 as well. For example, referring to FIG. 2, in an alternative embodiment the proximity sensors 90 are mounted along an end 98 of one of the aisles 34 and are positioned so the field of view 92 is oriented along a length L of a single aisle 34. For example, if the proximity sensors 90 include one or more cameras and a processor(s) coupled to the camera(s) to analyze the images obtained by the camera(s), the cameras are positioned so the field of view 92 includes a part of or the entire length L of a specific aisle 34.

Referring to FIGS. 6 and 7, the controller 70 monitors the proximity sensors 90 for the data indicating the presence of an individual within the selected area 94 of the interior cabin 18 of the vehicle 10. The controller 70 determines the presence of the individual within the selected area 94 of the interior cabin 18 of the vehicle 10 based on the electronic signals. The controller 70 instructs the actuator 66 to move the support structure 32 from the stowed position (FIG. 5) and into the deployed position (FIG. 6) in response to determining the individual is within the selected area 94 of the interior cabin 18 of the vehicle 10 and the vehicle 10 exceeds the threshold rate of movement.

In another embodiment, the proximity sensors 90 also obtain data indicating the presence of either an object or an individual that blocks the handle 36. When an individual or object blocks the handle 36, then the handle 36 impacts the individual or object as the support structure 32 is extended in the first direction D1 (FIG. 5). FIG. 8 illustrates the field of view 92 of the proximity sensor 90 directed towards an area 96 directly in front of the handle 36 of support structure 32 in the stowed position. The proximity sensors 90 obtain data indicating the presence of either an object or an individual in the area 96 directly in front of the handle 36 of the support structure 32 in the stowed position.

Figure 9:
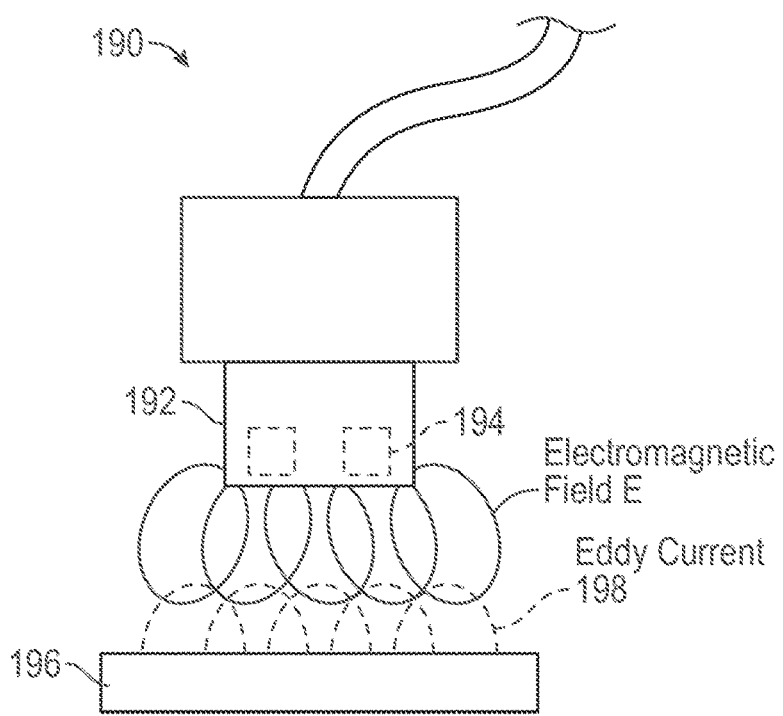
FIG. 9 illustrates an inductive proximity sensor, according to an exemplary embodiment.

Although a field of view 92 is described, it is to be appreciated that some proximity sensors 90 do not include a field of view 92. Referring to FIG. 9, in another embodiment the controller 70 (FIG. 6) is in electronic communication with one or more inductive proximity sensors 190. One example of an inductive proximity sensor 190 is an eddy current proximity sensor. The inductive proximity sensor 190 includes an oscillating circuit 192 having a coil 194. The coil 194 is configured to generate an electromagnetic field E. As an object 196 approaches the inductive proximity sensor 190, the conductive object 196 generates an eddy current 198 that opposes the electromagnetic field generated by the coil. Accordingly, referring to both FIGS. 8 and 9, the inductive proximity sensors 190 obtain data indicating the presence of the object 196 in the area 96 directly in front of the handle 36 of the support structure 32 in the stowed position based on detecting interruptions in the electromagnetic field E.

Referring to FIGS. 7 and 8, the controller 70 receives the data obtained by the proximity sensors 90 and determines an individual or an object is blocking the area 96 directly in front of the handle 36 of the support structure 32 in the stowed position (seen in FIG. 1). In response to determining the vehicle 10 exceeds the threshold rate of movement and the individual or object is blocking the area 96 directly in front of the handle 36 of the support structure 32 in the stowed position, the controller 70 instructs the actuator 66 to remain stationary to keep the support structure 32 in the stowed position.

In one embodiment, the data obtained by the proximity sensors 90 further indicates a distance between the handle 36 of the support structure 32 and the individual or object blocking the area 96 directly in front of the handle 36. Therefore, sometimes the support structure 32 is extended into a partially deployed or intermediate position. Specifically, the data obtained from the proximity sensors 90 indicate the individual or is partially blocking the area directly in front of the handle 36 of the support structure 32 in the stowed position. In response to determining the vehicle 10 exceeds the threshold rate of movement and the individual or object is partially blocking the area 96 directly in front of the handle 36 of the support structure 32 in the stowed position, the controller 70 instructs the actuator 66 to move the support structure 32 into the intermediate position.

Referring to FIGS. 1 and 3, the intermediate position is located between the stowed position and the deployed position. Referring specifically to FIG. 3, the handle 36 is located at a maximum displacement distance 100 when in the deployed position, where the maximum displacement distance 100 is measured between the outermost surface 50 of the overhead storage bins 22 and the outermost surface 48 of the handle 36. However, when the handle 36 is in the intermediate position, the handle 36 is located at an intermediate displacement distance 102 that is less than the maximum displacement distance 100. The intermediate displacement distance 102 is based on the distance between the handle 36 of the support structure 32 and the individual or object partially blocking the area 96 directly in front of the handle 36. Specifically, the intermediate displacement distance 102 ensures that the handle 36 does not contact the individual or object partially blocking the area 96 directly in front of the handle 36.

Figure 12:
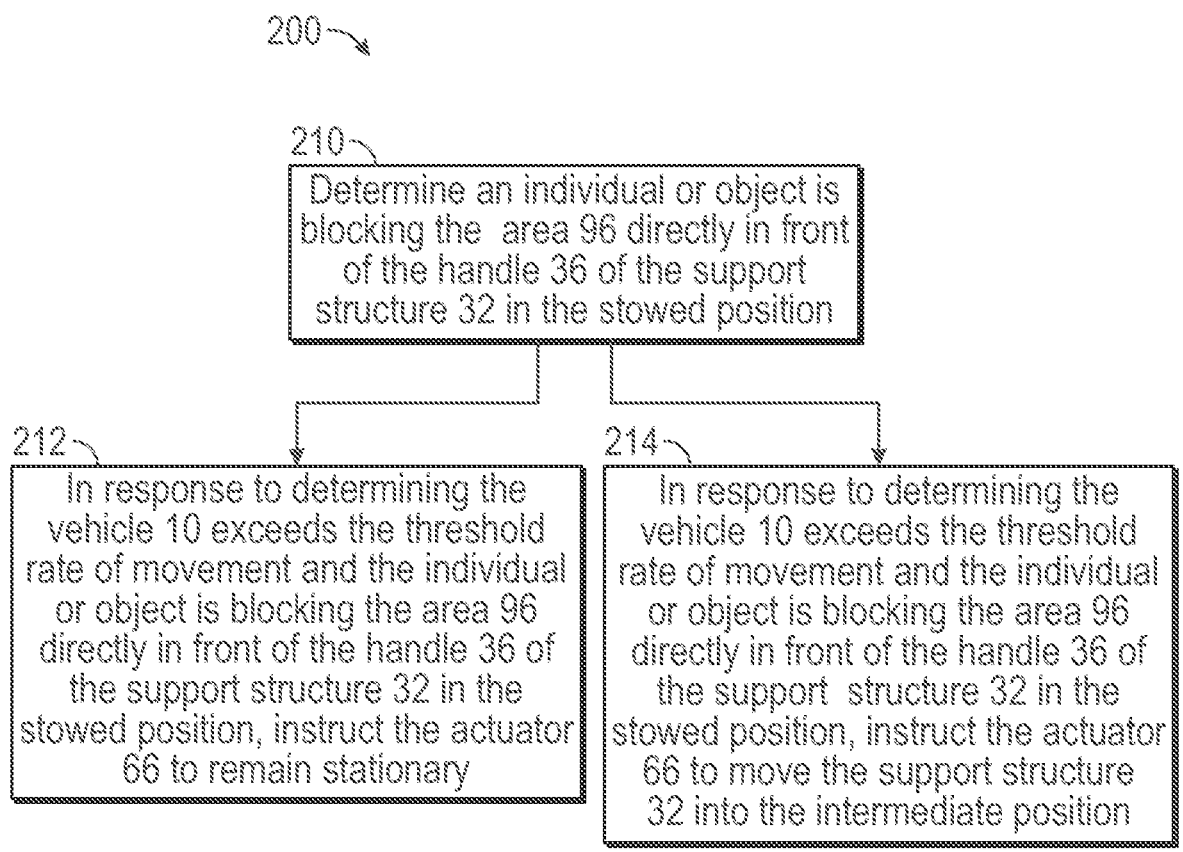

FIGS. 10, 11, and 12 illustrate various examples of a process flow diagram of a method 200 for extending the handle 36 of the support structure 32 into the deployed position. Referring to FIGS. 1, 3, 7, and 10, the method 200 begin at block 202. In block 202, the controller 70 determines the vehicle 10 exceeds the threshold rate of movement based on the data obtained by the sensors 72. As mentioned above, the threshold rate of movement indicates the abrupt change in motion by the vehicle 10. The method 200 may then proceed to block 204 or, alternatively, to block 206.

Continuing to refer to FIGS. 1, 3, 7, and 10, in block 204, in response to determining the vehicle 10 exceeds the threshold rate of movement, the controller 70 instructs the actuator 66 to move the support structure 32 into the deployed position (seen in FIG. 3). In an example, the method 200 may then terminate.

In an embodiment, the method 200 includes determining a presence of an individual within a selected area of an interior cabin of the vehicle based on data obtained by one or more proximity sensors; and instructing the actuator to move the support structure from the stowed position and into the deployed position in response to determining the individual is within the selected area of the interior cabin of the vehicle and the vehicle exceeds the threshold rate of movement. For instance, as shown in FIG. 11, the method 200 includes block 206. In block 206, the controller 70 determines the presence of an individual within the selected area 94 of the interior cabin 18 of the vehicle 10 (FIG. 7) based on the data obtained by the proximity sensors 90. The method 200 may then proceed to block 208.

In block 208, in response to determining the individual is within the selected area 94 of the interior cabin 18 of the vehicle 10 and the vehicle 10 exceeds the threshold rate of movement, the controller 70 instructs the actuator 66 to move the support structure 32 from the stowed position and into the deployed position. The method 200 may then terminate. In an embodiment, the steps of blocks 206 and 208 occur at a point in time after the step of block 204. In another example embodiment, the steps of blocks 206 and 208 occur after the step of block 202 rather than after block 204.

In an embodiment, the method 200 involves (i) determining an individual or an object is blocking an area directly in front of the handle of the support structure in the stowed position based on data obtained by one or more proximity sensors; and (ii) in response to determining the vehicle exceeds the threshold rate of movement and the individual or the object is blocking the area directly in front of the handle of the support structure in the stowed position, instructing the actuator to remain stationary to keep the support structure in the stowed position.

For instance, as shown in FIG. 12, the method 200 includes block 210. In block 210, the controller 70 determines an individual or an object is blocking the area 96 directly in front of the handle 36 (seen in FIG. 8) of the support structure 32 in the stowed position. It is to be appreciated that the handle 36 makes contact or impacts the individual or object located within the area 96 of the interior cabin 18. This impact may cause passenger discomfort or annoyance. The method 200 may proceed to either block 212 or 214.

In an example, the method 200 proceeds from block 210 to block 212. In block 212, in response to determining the vehicle 10 exceeds the threshold rate of movement and the individual or object is blocking the area 96 directly in front of the handle 36 of the support structure 32 in the stowed position, the controller 70 instructs the actuator 66 to remain stationary to keep the support structure in the stowed position. The method 200 may then terminate.

Alternatively, in an example, the method 200 proceeds from block 210 to 214. In block 214, in response to determining the vehicle 10 exceeds the threshold rate of movement and the individual or object is blocking the area directly in front of the handle 36, the controller 70 instructs the actuator 66 to move the support structure 32 into the intermediate position. As mentioned above, the intermediate position represents a partially deployed handle 36. The method 200 may then terminate. In an embodiment, the steps of blocks 210 and 212 or 214 occur at a point in time after the step of block 204. In another example embodiment, the steps of blocks 210 and 212 or 214 occur after the step of block 202 rather than after block 204.

Referring generally to the figures, the disclosed handle system provides various technical effects and benefits. Specifically, the handle is normally in the stowed position as seen in FIG. 1, which conforms to the sleek interior cabin of the vehicle. However, when the vehicle undergoes abrupt changes in motion, such as during turbulence or during landing of an aircraft, then the support structure is extended into the deployed position to provide support to passengers. Accordingly, the disclosure provides an approach for maintaining the sleek, clean lines of a vehicle's interior while at the same time providing features for passengers to hold onto during abrupt changes in motion.

Figure 13:
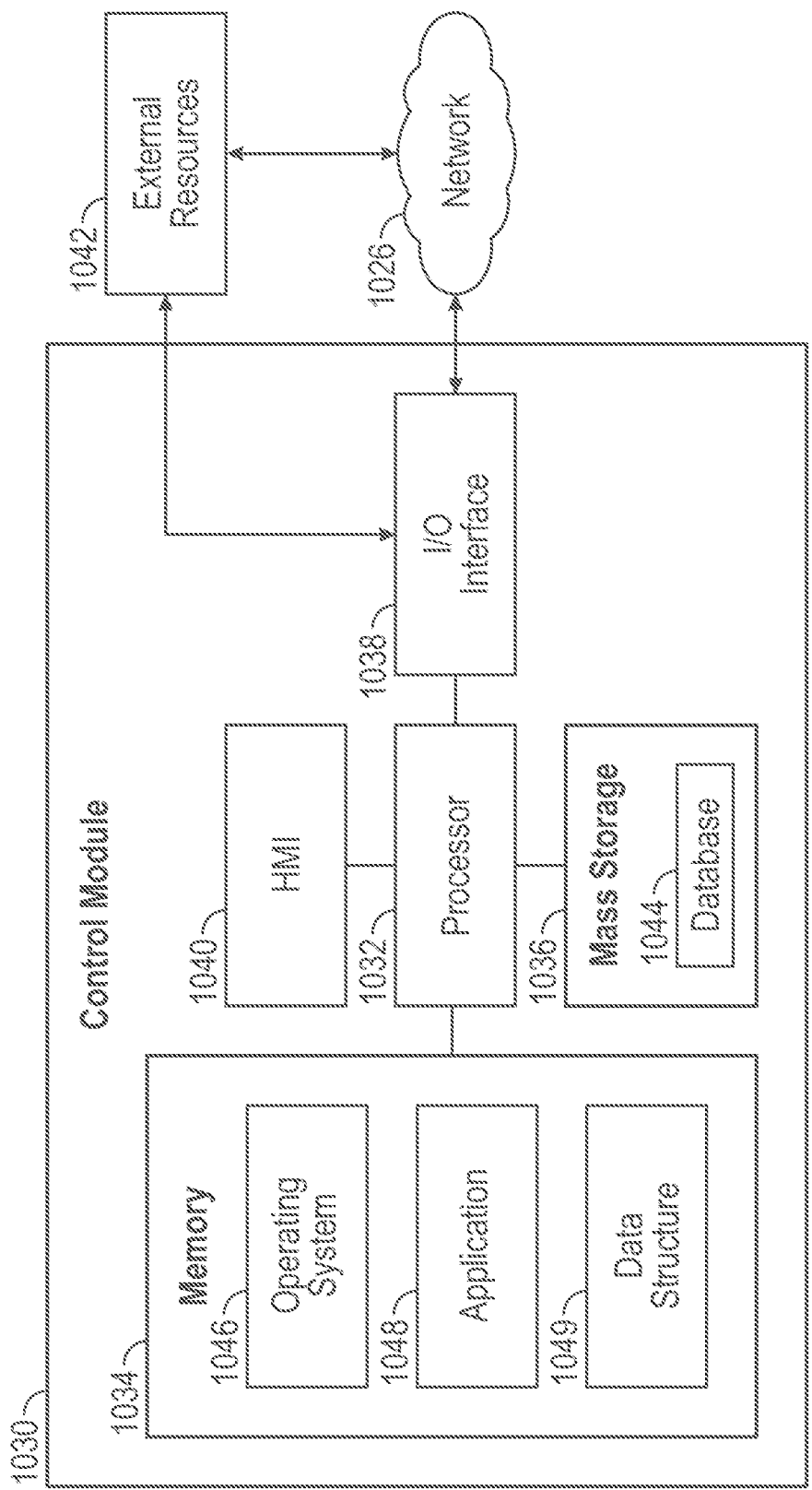
FIG. 13 is an illustration of a computer system for the handle system, according to an exemplary embodiment.

Referring now to FIG. 13, the controller 70 is implemented on one or more computer devices or systems, such as exemplary computer system 1030. The computer system 1030 includes a processor 1032, a memory 1034, a mass storage memory device 1036, an input/output (I/O) interface 1038, and a Human Machine Interface (HMI) 1040. The computer system 1030 is operatively coupled to one or more external resources 1042 via the network 1026 or I/O interface 1038. External resources may include, but are not limited to, servers, databases, mass storage devices, peripheral devices, cloud-based network services, or any other suitable computer resource that may be used by the computer system 1030.

The processor 1032 includes one or more devices selected from microprocessors, micro-controllers, digital signal processors, microcomputers, central processing units, field programmable gate arrays, programmable logic devices, state machines, logic circuits, analog circuits, digital circuits, or any other devices that manipulate signals (analog or digital) based on operational instructions that are stored in the memory 1034. Memory 1034 includes a single memory device or a plurality of memory devices including, but not limited to, read-only memory (ROM), random access memory (RAM), volatile memory, non-volatile memory, static random-access memory (SRAM), dynamic random-access memory (DRAM), flash memory, cache memory, or any other device capable of storing information. The mass storage memory device 1036 includes data storage devices such as a hard drive, optical drive, tape drive, volatile or non-volatile solid-state device, or any other device capable of storing information.

The processor 1032 operates under the control of an operating system 1046 that resides in memory 1034. The operating system 1046 manages computer resources so that computer program code embodied as one or more computer software applications, such as an application 1048 residing in memory 1034, may have instructions executed by the processor 1032. In an alternative example, the processor 1032 may execute the application 1048 directly, in which case the operating system 1046 may be omitted. One or more data structures 1049 also reside in memory 1034, and may be used by the processor 1032, operating system 1046, or application 1048 to store or manipulate data.

The I/O interface 1038 provides a machine interface that operatively couples the processor 1032 to other devices and systems, such as the network 1026 or external resource 1042. The application 1048 thereby works cooperatively with the network 1026 or external resource 1042 by communicating via the I/O interface 1038 to provide the various features, functions, applications, processes, or modules comprising examples of the disclosure. The application 1048 also includes program code that is executed by one or more external resources 1042, or otherwise rely on functions or signals provided by other system or network components external to the computer system 1030. Indeed, given the numerous hardware and software configurations possible, persons having ordinary skill in the art will understand that examples of the disclosure may include applications that are located externally to the computer system 1030, distributed among multiple computers or other external resources 1042, or provided by computing resources (hardware and software) that are provided as a service over the network 1026, such as a cloud computing service.

The HMI 1040 is operatively coupled to the processor 1032 of computer system 1030 in a known manner to allow a user to interact directly with the computer system 1030. The HMI 1040 may include video or alphanumeric displays, a touch screen, a speaker, and any other suitable audio and visual indicators capable of providing data to the user. The HMI 1040 also includes input devices and controls such as an alphanumeric keyboard, a pointing device, keypads, pushbuttons, control knobs, microphones, etc., capable of accepting commands or input from the user and transmitting the entered input to the processor 1032.

A database 1044 may reside on the mass storage memory device 1036 and may be used to collect and organize data used by the various systems and modules described herein.

The database 1044 may include data and supporting data structures that store and organize the data. In particular, the database 1044 may be arranged with any database organization or structure including, but not limited to, a relational database, a hierarchical database, a network database, or combinations thereof. A database management system in the form of a computer software application executing as instructions on the processor 1032 may be used to access the information or data stored in records of the database 1044 in response to a query, where a query may be dynamically determined and executed by the operating system 1046, other applications 1048, or one or more modules.

By the term "about" with reference to amounts or measurement values, it is meant that the recited characteristic, parameter, or value need not be achieved exactly. Rather, deviations or variations, including, for example, tolerances, measurement error, measurement accuracy limitations, and other factors known to those skilled in the art, may occur in amounts that do not preclude the effect that the characteristic was intended to provide. In an example embodiment, the phrase "about value X" means within 5% of value X.

The description of the present disclosure is merely exemplary in nature and variations that do not depart from the gist of the present disclosure are intended to be within the scope of the present disclosure. Such variations are not to be regarded as a departure from the spirit and scope of the present disclosure.

What is claimed is:

1. A handle system for an interior cabin of a vehicle, the handle system comprising:
   a support structure defining a handle, the support structure moveable between a stowed position where the handle is inaccessible by a passenger and a deployed position where the handle is accessible by the passenger;
   an arm including a first end portion and a second end portion, wherein the first end portion of the arm is connected to the support structure, and wherein the arm extends the handle into the deployed position and into the interior cabin of the vehicle;
   an actuator operably coupled to the support structure by the second end portion of the arm, wherein the actuator is configured to move the support structure between the stowed position and the deployed position;
   one or more sensors configured to obtain data indicative of vehicle motion; and
   a controller in electronic communication with the actuator and the one or more sensors, the controller configured to:
      determine the vehicle exceeds a threshold rate of movement based on the data indicative of vehicle motion obtained by the one or more sensors, wherein the threshold rate of movement indicates an abrupt change in motion by the vehicle; and
      in response to determining the vehicle exceeds the threshold rate of movement, instruct the actuator to move the support structure from the stowed position and into the deployed position.

2. The handle system of claim 1, further comprising one or more proximity sensors in electronic communication with the controller, wherein the proximity sensors have a field of view directed towards a selected area of the interior cabin of the vehicle.

3. The handle system of claim 2, wherein the proximity sensors are configured to obtain data indicating a presence of an individual within the selected area of the interior cabin of the vehicle.

4. The handle system of claim 3, wherein the controller is configured to:
   determine the presence of the individual within the selected area of the interior cabin of the vehicle based on the data obtained by the one or more proximity sensors; and
   instruct the actuator to move the support structure from the stowed position and into the deployed position in response to determining the individual is within the selected area of the interior cabin of the vehicle and the vehicle exceeds the threshold rate of movement.

5. The handle system of claim 3, wherein the proximity sensors include one or more of the following: a millimeter wave sensor, an infrared sensor, a light proximity sensor, a camera, a radar, and a light detection and ranging (LIDAR) sensor.

6. The handle system of claim 1, further comprising one or more proximity sensors in electronic communication with the controller, wherein the proximity sensors have a field of view directed towards an area directly in front of the handle of the support structure in the stowed position.

7. The handle system of claim 6, wherein the proximity sensors are configured to obtain data indicating an individual or an object is blocking the area directly in front of the handle of the support structure in the stowed position.

8. The handle system of claim 7, wherein the controller is configured to:
   determine the individual or the object is blocking the area directly in front of the handle of the support structure in the stowed position based on the data obtained by the proximity sensors; and
   in response to determining the vehicle exceeds the threshold rate of movement and the individual or the object is blocking the area directly in front of the handle of the support structure in the stowed position, instruct the actuator to remain stationary to keep the support structure in the stowed position.

9. The handle system of claim 7, wherein the controller is configured to:
   determine the individual or the object is blocking the area directly in front of the handle of the support structure in the stowed position based on the data obtained by the proximity sensors; and
   in response to determining the vehicle exceeds the threshold rate of movement and the individual is partially blocking the area directly in front of the handle of the support structure in the stowed position, instruct the actuator to move the support structure into an intermediate position.

10. The handle system of claim 1, further comprising one or more inductive proximity sensors in electronic communication with the controller.

11. The handle system of claim 1, wherein the one or more sensors include at least one of: one or more accelerometers, one or more gyroscopes, and one or more magnetometers.

12. The handle system of claim 11, wherein the one or more sensors include one or more accelerometers, one or more gyroscopes, and one or more magnetometers, and wherein the one or more accelerometers are configured to obtain inertial force data, the one or more gyroscopes are configured to obtain angular velocity data, and the one or more magnetometers are configured to obtain magnetic field data.

13. The handle system of claim 12, wherein the controller is configured to:
   fuse the inertial force data, the angular velocity data, and magnetic field data together and produce a three-dimensional location value, a three-dimensional movement value, and a three dimensional acceleration value.

14. The handle system of claim 1, wherein the abrupt change in motion is created as the vehicle undergoes one or more of the following: turbulence, an abnormal gravity angle, a sudden stop, and landing.

15. An aircraft, comprising:
an interior cabin; and
a handle system located within the interior cabin of the aircraft, wherein the handle system comprises:
a support structure defining a handle, the support structure moveable between a stowed position where the handle is inaccessible by a passenger and a deployed position where the handle is accessible by the passenger;
an arm including a first end portion and a second end portion, wherein the first end portion of the arm is connected to the support structure, and wherein the arm extends the handle into the deployed position and into the interior cabin of the vehicle;
an actuator operably coupled to the support structure by the second end portion of the arm, wherein the actuator is configured to move the support structure between the stowed position and the deployed position;
one or more sensors configured to obtain data indicative of motion of the aircraft; and
a controller in electronic communication with the actuator and the one or more sensors, the controller configured to:
determine the aircraft exceeds a threshold rate of movement based on the data indicative of motion of the aircraft obtained by the one or more sensors, wherein the threshold rate of movement indicates an abrupt change in motion by the aircraft; and
in response to determining the aircraft exceeds the threshold rate of movement, instruct the actuator to move the support structure from the stowed position and into the deployed position.

16. The aircraft of claim 15, further comprising one or more proximity sensors in electronic communication with the controller, wherein the proximity sensors have a field of view directed towards a selected area of the interior cabin of the aircraft.

17. The aircraft of claim 16, wherein the proximity sensors are configured to obtain data indicating a presence of an individual within the selected area of the interior cabin of the aircraft.

18. A method of extending a handle of a support structure from a stowed position and into a deployed position, wherein the handle is part of a handle system of a vehicle, the method comprising:
determining, by a computer, the vehicle exceeds a threshold rate of movement based on data indicative of vehicle motion obtained by one or more sensors, wherein the threshold rate of movement indicates an abrupt change in motion by the vehicle; and
in response to determining the vehicle exceeds the threshold rate of movement, instructing an actuator to move the support structure from the stowed position and into the deployed position, wherein the actuator is operably coupled to the support structure by an arm, and wherein the arm extends the handle into the deployed position and into an interior cabin of the vehicle.

19. The method of claim 18, further comprising:
determining a presence of an individual within a selected area of the interior cabin of the vehicle based on data obtained by one or more proximity sensors; and
instructing the actuator to move the support structure from the stowed position and into the deployed position in response to determining the individual is within the selected area of the interior cabin of the vehicle and the vehicle exceeds the threshold rate of movement.

20. The method of claim 18, further comprising:
determining an individual or an object is blocking an area directly in front of the handle of the support structure in the stowed position based on data obtained by one or more proximity sensors; and
in response to determining the vehicle exceeds the threshold rate of movement and the individual or the object is blocking the area directly in front of the handle of the support structure in the stowed position, instructing the actuator to remain stationary to keep the support structure in the stowed position.

* * * * *